(12) United States Patent
Tucker

(10) Patent No.: US 11,151,675 B2
(45) Date of Patent: Oct. 19, 2021

(54) LEGAL EVENT BOOKING SYSTEMS AND METHODS

(71) Applicant: PUSH LEGAL SERVICES, LLC, Fort Lauderdale, FL (US)

(72) Inventor: Sarah Nicole Tucker, Fort Lauderdale, FL (US)

(*) Notice: Subject to any disclaimer, the term of this patent is extended or adjusted under 35 U.S.C. 154(b) by 133 days.

(21) Appl. No.: 15/822,530

(22) Filed: Nov. 27, 2017

(65) Prior Publication Data

US 2018/0150927 A1 May 31, 2018

Related U.S. Application Data

(60) Provisional application No. 62/426,449, filed on Nov. 25, 2016.

(51) Int. Cl.
*G06Q 50/26* (2012.01)
*G06Q 10/10* (2012.01)
*G06Q 10/06* (2012.01)

(52) U.S. Cl.
CPC ..... *G06Q 50/26* (2013.01); *G06Q 10/063114* (2013.01); *G06Q 10/1097* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 9,904,900 | B2* | 2/2018 | Cao | G06Q 10/083 |
| 10,055,698 | B2* | 8/2018 | Elenbaas | G06Q 10/06 |
| 10,062,042 | B1* | 8/2018 | Kelly | G06Q 10/063116 |
| 10,192,180 | B2* | 1/2019 | Prabhakara | G06Q 10/063118 |
| 2002/0040313 | A1* | 4/2002 | Hunter | G06Q 10/06 705/7.13 |
| 2002/0065702 | A1* | 5/2002 | Caulfield | G06Q 10/04 705/7.15 |
| 2002/0123921 | A1* | 9/2002 | Frazier | G06Q 10/063112 705/7.14 |
| 2003/0144862 | A1* | 7/2003 | Smith | G06Q 10/10 705/321 |
| 2004/0267595 | A1* | 12/2004 | Woodings | G06Q 10/06311 705/7.14 |
| 2005/0096962 | A1* | 5/2005 | Narasimhan | G06Q 10/1097 705/7.16 |
| 2006/0111955 | A1* | 5/2006 | Winter | H04W 4/029 705/7.19 |
| 2007/0250370 | A1* | 10/2007 | Partridge | G06Q 10/1097 705/7.14 |
| 2008/0027783 | A1* | 1/2008 | Hughes | G06Q 10/00 705/7.14 |
| 2011/0300894 | A1* | 12/2011 | Roberts, Sr. | G06Q 10/08 455/521 |
| 2012/0029962 | A1* | 2/2012 | Podgurny | G06Q 50/30 705/7.13 |
| 2012/0084225 | A1* | 4/2012 | Soldatenkov | G06Q 10/06 705/345 |
| 2017/0039505 | A1* | 2/2017 | Prabhakara | G06Q 10/063112 |

(Continued)

*Primary Examiner* — Alan S Miller

(74) *Attorney, Agent, or Firm* — Tucker Law; Matthew Sean Tucker, Esq.

(57) ABSTRACT

A legal event booking interface that provides for selection means for selection a legal service provider including between a digital reporter, stenographer, videographer, interpreter (not shown), or a combination thereof, and selection means for selecting and reserving a job location.

16 Claims, 18 Drawing Sheets

(56) References Cited

U.S. PATENT DOCUMENTS

2017/0154348 A1\* 6/2017 Biswas .............. G06Q 30/0206
2017/0243170 A1\* 8/2017 Rashid .................. H04W 4/021

\* cited by examiner

LEGAL EVENT BOOKING SYSTEMS AND METHODS

CROSS-REFERENCE TO RELATED APPLICATION

This application is related to and claims benefit to U.S. Provisional Patent Application Ser. No. 62/426,449, filed Nov. 25, 2016, entitled LEGAL EVENT BOOKING SYSTEMS AND METHODS, the entirety of which is incorporated herein by reference.

FIELD OF THE INVENTION

The present invention relates to the field of legal booking services over a network, and more particularly to systems and methods for legal booking, including that of court reporting, videographers, interpreters, and processor servers over the internet.

BACKGROUND OF THE INVENTION

In the normal course of practicing law, court reporters are commonly hired to memorialize oral speech to a transcribed written form to produce official transcripts of a particular job, such as court hearings, depositions, and trials. Currently, court reporting companies are contacted by attorneys, and their staff, to assign court reporters that are hired as independent contractors on a per job basis. Presently, court reporting companies have human employees that act as the middle man for assigning court reporters, videographers, process servers, and the like. Attorneys do not typically have a choice in the court reporters assigned to their job or otherwise know what reporter is assigned to a job ahead of time. Nor do attorneys have direct communication with the person performing the job, nor is there an interface for communicating directly with the person performing the job.

Devoid of past experience with that reporter, the attorney will not know the level of experience of the particular court reporter. There is no currently any system, forum, or interface to which an individual court reporter's skill level or accuracy is evaluated and made available to the consumer, in this case the consumer would be the attorney, their staff, the attorney's client, and insurance companies.

Because court reporting jobs can involve complex terms, such as legal terms, engineering terms, medical terms, and other unique areas of inquiry, it can be important to hire a reporter for a job that is familiar with those particular areas of practice.

Devoid of past reviews or personal experience with that assigned reporter, it is challenging for attorneys to determine whether the particular court reporter is capable of accurately transcribing a particular job, aside from relying on the court reporting companies own testament to that particular stenographer, of which is clearly biased by virtue of the company's financial interest.

There is a need in the art for a legal booking system and a court reporter scheduling system that improves the line of communication between the attorney and the court reporter and/or other person providing the service

SUMMARY OF THE INVENTION

The present invention advantageously provides a booking interface for booking a legal service provider.

According to an embodiment of the present invention, a principal object is to provide a direct communication for legal booking between a legal service provider (e.g., court reporters, stenographers, digital court reporters, videographers, court reporters, interpreters) and a legal user (e.g., attorneys, insurance company, and legal staff)

According to an embodiment of the present invention, another object is to a legal accountability system and process for accountability of work product, skill, and a user rating system.

According to an embodiment of the present invention, another object is to a system and method for reducing legal costs, increasing last minute legal service provider bookings, and improved communication between legal users and legal service providers.

According to an embodiment of the present invention, a principal object is to provide a method for receiving court reporter booking services from a first mobile computing device, the method is performed by one or more processors, a job request to book court reporter services from the first mobile computing device is received, a court reporter to the job request at least partially based on location based services of a second mobile computing device of the court reporter is assigned, confirmation of the court reporter service booking for display on an interface of the first mobile computing device is delivered, and confirmation of the court reporter service booking for display on an interface of the second mobile computing device is delivered.

According to an embodiment of the present invention, a principal object is to provide a non-transitory tangible computer-readable storage medium having executable computer code stored thereon for secure communications on a digital network, the computer code comprising a set of instructions that causes one or more processors to perform operations, from the first mobile computing device, a job request to book court reporter services is received, location data from a plurality of court report computing device is received, a court reporter to the job request is assigned, confirmation of the court reporter service booking for display on an interface of the first mobile computing device is delivered, confirmation of the court reporter service booking for display on an interface of a second mobile computing device of the court reporter is delivered, and selection of a particular court reporter from the list is received.

Other objects will become evident as the present invention is described in detail below.

BRIEF DESCRIPTION OF THE DRAWINGS

Embodiments of the present application are described herein in which similar elements are given similar reference characters, and a more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
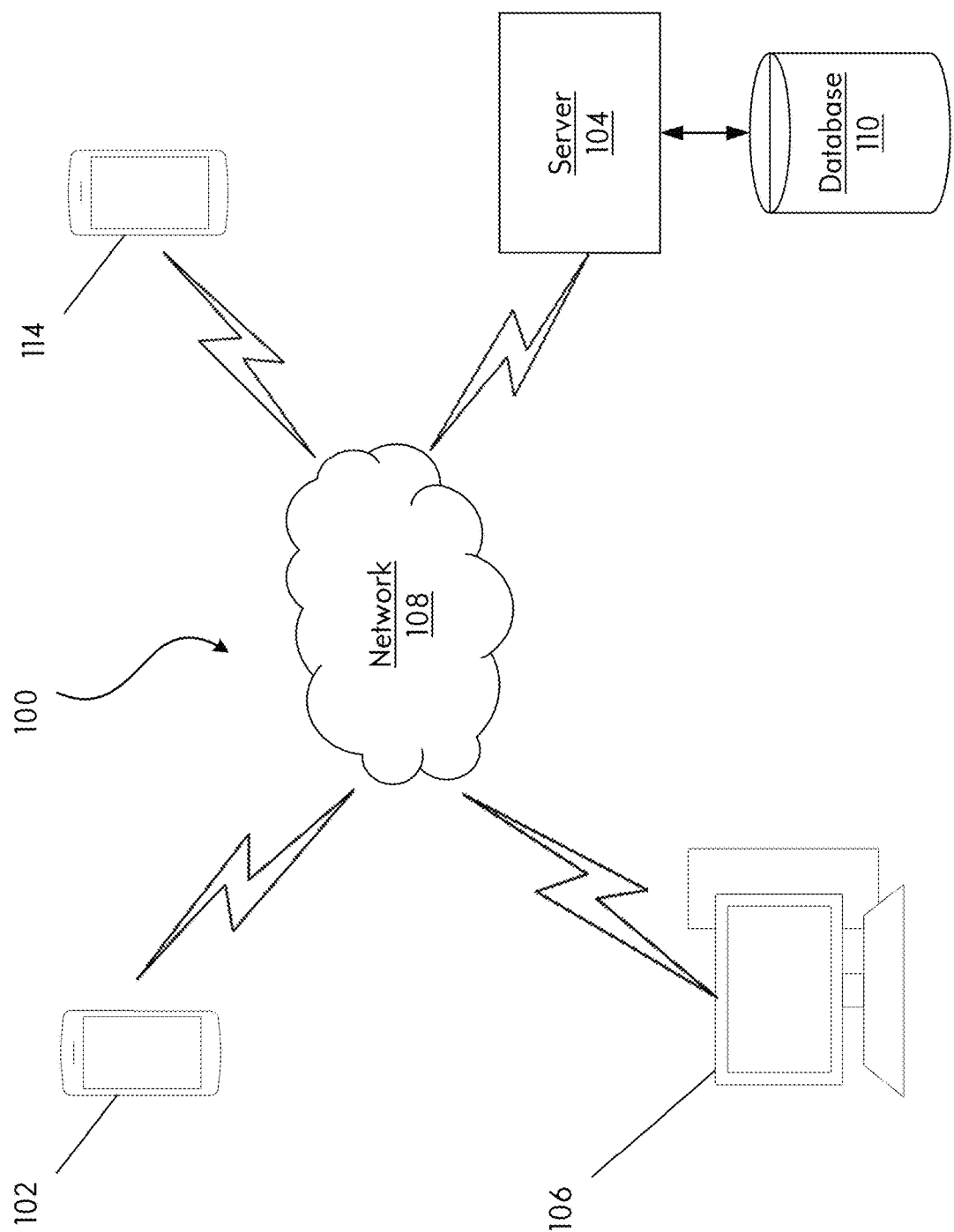
FIG. 1 is a block diagram of an exemplary event scheduling system in accordance with the principles of the present embodiment.

The present invention advantageously provides a system and method for legal booking and/or assigning court reporters. The present invention contemplates various types of implementations for booking and/or assigning court reporters.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring now to the drawings figures in which like reference designators refer to like elements. FIG. 1 is a block diagram of an exemplary embodiment of a court reporting booking system constructed in accordance with the principles of the present invention and designated generally as court reporter system 100. In particular, the court reporting booking system 100 may comprise hardware and/or software that conduct various operations for booking a court reporter, a videographer, a process server, and other service providers described herein, booking an event location, and other operations and/or events described herein. In this embodiment, the court reporter system 100 includes one or more mobile devices (e.g., mobile device 102), one or more servers (e.g., server 104), one or more computers (e.g., computer 106) and/or one or more networks (e.g., network 108).

Mobile device 102 may be any computing device (including without limitation smart phones, smart device, tablets) with which a user (e.g., lawyer, legal staff, insurance company) may have user interaction, including without limitation a mobile phone (e.g., a smart phone, including without limitation iPhones and Android phones) or a tablet computer. Mobile device 102 may send and/or receive data to and/or from other devices and systems in FIG. 1, including through network 108. While a single mobile device 102 is depicted in FIG. 1, the court reporter system 100 is expected to include a large number of mobile devices accessing the court reporter booking system 100 through the network 108. Any mobile device that has access to network 108 may be able to communicate with the server 104 and/or other mobile device.

Network 108 may include, without limitation and for exemplary purposes, the Internet, an intranet, a cellular carrier network, a landline telephone network, a local area network (LAN), a wireless local area network (WLAN, and/or a dedicated connection. The plurality of mobile devices 102, computers 106, and servers 104 may communicate directly or indirectly over the network 108.

Server 104 as exemplified in FIG. 1 may represent a single device (such as a single computer) or multiple devices (such as multiple computers). Server 104 may be configured to communicate with the mobile devices 102 and/or computers 106, and respond based on information stored in the server 104 or another internal or external library, including cloud storage. For example, a mobile device 102 may provide information about its current location. In response, server 104 may provide information about the location of a court reporter by way of the court reporter mobile device 114.

The one or more mobile devices 102, the one or more computers 106, and the one or more servers 104 may each include one or more non-transitory tangible computer-readable media storage, such as one or more solid state drives, optical drives, magnetic drives, tape drives, and/or other types of hard drives and/or memory capable of storing data.

The server 104 may include a database 110. The database 110 may each include one or more non-transitory tangible computer-readable media storage, such as one or more solid state drives, optical drives, magnetic drives, tape drives, and/or other types of hard drives and/or memory. The one or more computer-readable media of database 110 may store information about one or more court reporter mobile device 114, the information may be accessed by one or more mobile device 102, server 104, and/or computer 106. Each of the one or more mobile device 102, computer 106 and/or court reporting mobile device 114 may be associated with a user account.

The user account may be referenced interchangeably herein as an account or as the device on which the account is accessed, including any of mobile device 102, computer 106 and court reporting mobile device 114.

The user account may be associated with a location, including without limitation a real-time location and/or a user defined location.

Each of the one or more mobile device 102, computer 106 and court reporting mobile device 114 may be associated with a user account operable to be used on any of the devices defined herein. A user account may be accessible by a single user and/or by a plurality of users.

The user account may be associated with location data and other non-location property data, including without limitation a real-time location data and a user defined location data. The associated account may include multiple logins to be used across multiple devices and include a plurality of location data associated with the user account. The associated account may include multiple logins to allow multiple users access to the user account. For example, multiple logins allow for administrators, staff, attorneys, insurance companies, clients, and like, with full or privileged access and/or limited access to the account, features, cases, transcripts, schedule jobs, and other account or user information. This allows the law firm or insurance company to control access to data by staff, as well as attorneys that are timely screened due to conflicts.

The user account properties having non-location data may include without limitation user rankings, previous jobs performed, total number of jobs performed, total number of jobs previously purchased, hours available, available schedule, scheduled vacations, previously scheduled future jobs, specific or generalized available equipment. User rankings may be calculated or otherwise determined via court reporter ratings and/or canceled job percentage. For example, jobs performed may include court reporter jobs recorded by a court reporter.

The user account may include court reporter accounts, law firm accounts, attorney accounts, and staff accounts, service provider accounts, process server accounts, videographer accounts, insurance company accounts, and the like.

As discussed herein, the server 104 is operable to use the information stored in the database 110 to determine what information to send to each and any of one or more mobile device 102, computer 106 and court reporting mobile device 114, including location and non-location data.

Each and any of one or more mobile device 102, computer 106 and court reporting mobile device 114 may communicate or otherwise interact with server 104 in a variety of ways. The server 104 may include web server functionality, and each and/or any of one or more mobile device 102, computer 106 and court reporting mobile device 114 may use a dedicated software application or an internet browser to communicate and interact with the server 104.

Figure 2:
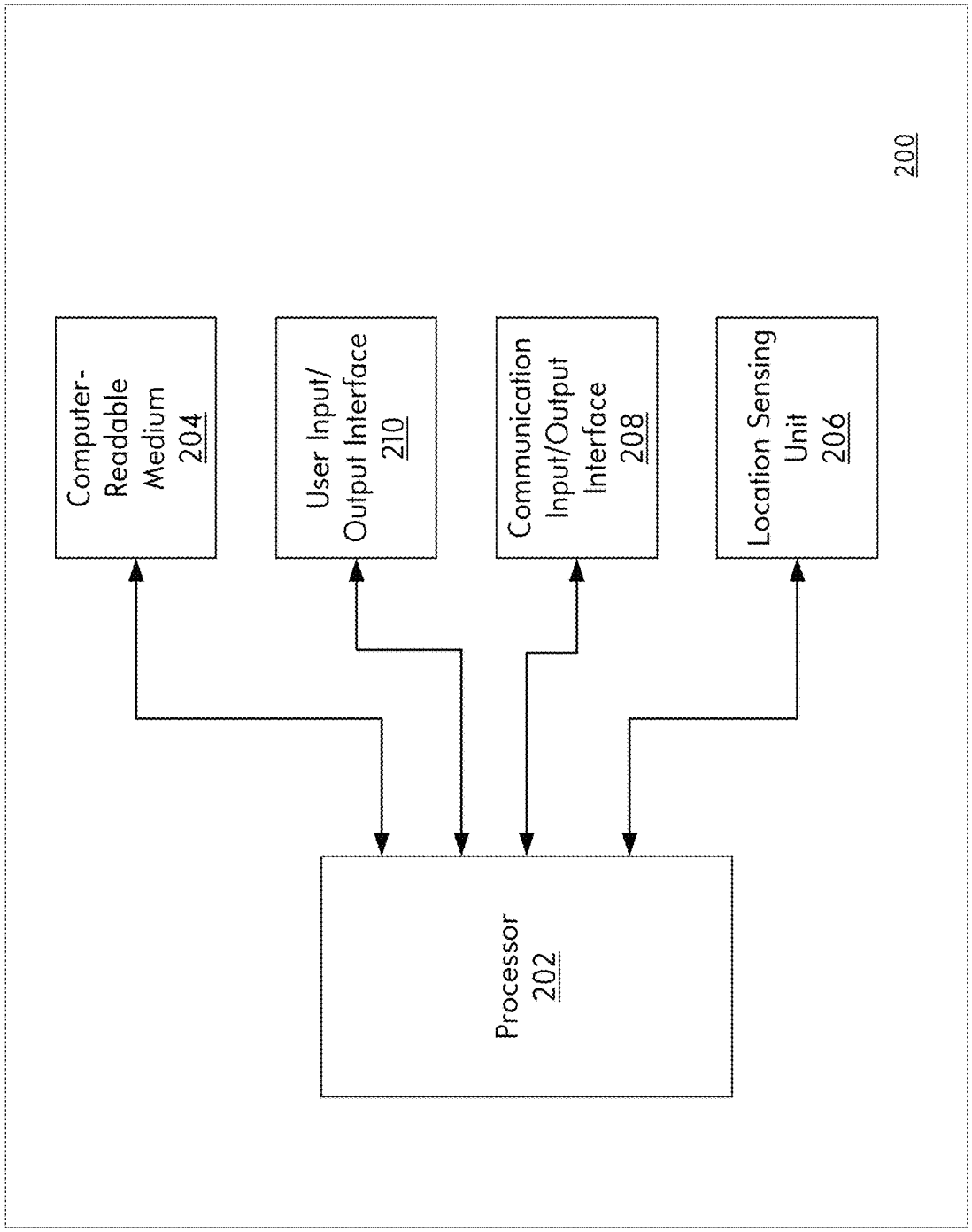
FIG. 2 is a block diagram of an exemplary computing device described herein in accordance with the principles of the present embodiment.

Referring now to FIG. 2, a block diagram is shown of an exemplary computing device 200 that may be used to embody, either partially or fully, each of any of the one or more mobile device 102, computer 106 and court reporting mobile device 114. Computing device 200 may include hardware and software. The hardware may execute software to perform functions thereof. The software, if any, may be executed via a processor 202 and the software may be stored on a tangible non-transitory computer-readable medium 204. Computing device 200 may read those computer-readable instructions, and in response perform various steps as instructed by the computer-readable instructions. Accordingly, any steps, functions, calculations, device, and other elements described herein may be implemented by a computer, such as by reading and executing computer-readable instructions for performing those functions, and/or by any hardware, such as processor 202, from which computing device 200 is composed. Additionally, or alternatively, any of the above-mentioned functions may be implemented by the hardware of computing device 200, with or without the execution of software. The computing device 200 may include microprocessors, central processing units (CPUs) and/or other types of elements capable of performing some or all of the functions attributed to the computing device 200.

Processor 202 may process user input data, including data entered via a touch screen device or via verbal instructions, or via information received on the computing device 200 via an outside source over the network 108.

Computer-readable medium 204 may include a single physical non-transitory medium, or a combination of one or more such non-transitory medium, which may include without limitation solid state drives, hard drives, memories, optical discs (e.g., CDs or DVDs), magnetic discs, and magnetic tape drives. The computer-readable medium 204 may be a physical component of the computing device 200, or may alternatively be a remote component accessible by the computer device 200 over the network 108, including read/write functionality.

Computing device 200 may include a communication input/output interface 208 for facilitating communication of the computing device 200 across the network 108 to communicate with the server 104 and/or other computing device 200.

Computing device 200 may include a location sensing unit 206 capable of receiving and/or determining the location of the computing device 200, particularly when the computing device embodies the either of one or more of mobile device 102 and one or more of court reporting mobile device 114. The location sensing unit 206 may include a global-positioning system (GPS) but is not so limited. The location sensing unit 206 may utilize a combination of software and hardware to locate a local computing device 200 or may be utilized to locate a remote computing device 200.

Computing device 200 may also include user input/output interface 210 for receiving input from a user (e.g. via a virtual/digital keyboard, physical keyboard, mouse, audio microphone, camera, document upload, touchscreen, remote control and/or other input elements) and providing output to the user (e.g., a digital display, touchscreen display, audio speaker, piezoelecric element, printer, and/or other output elements). The processor 202 may cause a variety of inputs and outputs and or the display of information to the user and/or providing interactive data for a user including providing user communications, interactions, and a variety of data over the network 108.

Figure 3:
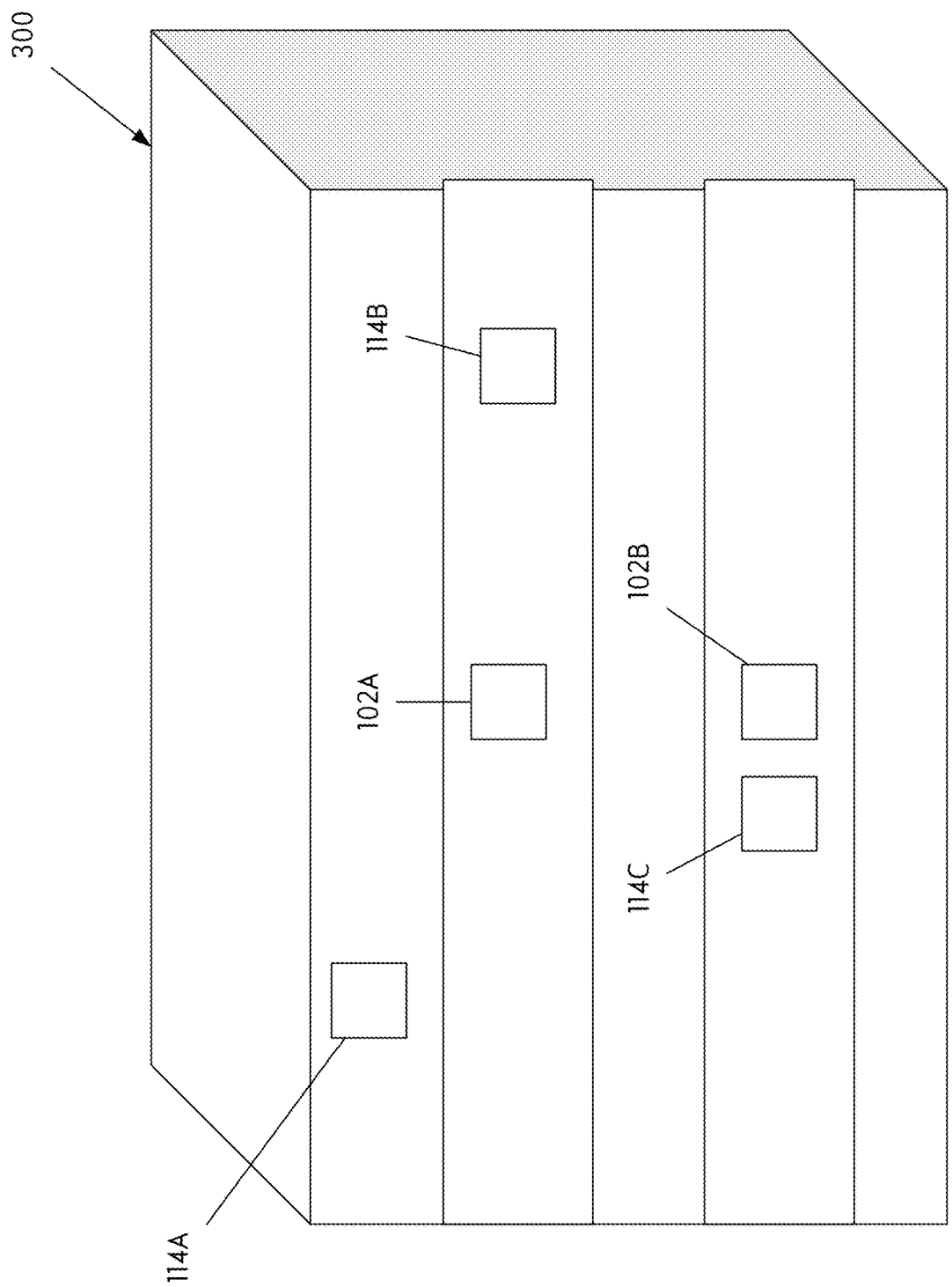
FIG. 3 is an illustration of an exemplary building having a plurality of user device thereabout in accordance with the principles of the present embodiment.

FIG. 3 is a diagram that presents an exemplary building 300 with example locations of various court reporting mobile device 114A-C at different geographic locations and altitudes/floors about the building 300 and various mobile device 102A-B about the building 300, including various latitudes and longitudes, as well as various altitudes/floors. In this particular non-limiting example, various court reporters, with their associated mobile device 114, are located at various locations and floors about the building 300. Additionally, attorney users, with their respective mobile device 102A-B, are located at various locations and floors about the building 300. In one non-limiting embodiment, the building 300 is a courthouse. The server 104 receives location data of the various device 102 and 114 for calculation and automatically assigning jobs.

Figure 4:
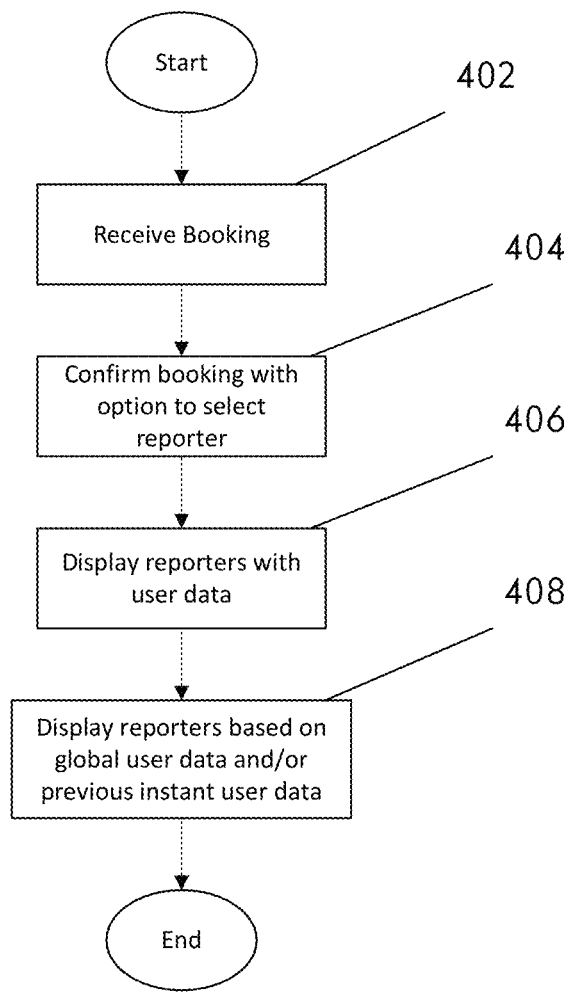
FIG. 4 is a flow chart of an exemplary booking process in accordance with the principles of the present embodiment.

FIG. 4 is a flow chart showing example process that may be performed during an example operation of FIG. 1. At block 402, the server 104 receives a booking from a mobile device 102 and/or computer 106 for live booking of a court reporter at a particular building 300. At block 404, the user, via the mobile device 102 and/or computer 106, receives a confirmation of booking via a user input/output interface

210. Alternatively, the confirmation may be via an email, SMS messaging, text messaging, direct messaging, mobile app notification, or other like notification means. At block 406, which may be contemporaneous with block 404, the user, via the mobile device 102 and/or computer 106, receives data from database 110 with court reporter user data, which may optionally include without limitation a plurality of court reporter data including for each court reporter, the court reporter's present location (i.e., based on their associated court reporter mobile device 114), presently scheduled court reporting jobs, total number of previous jobs, star or other user rating based on prior jobs, and user data and/or other data as desired (See FIG. 11 for exemplary purposes).

In one non-limiting embodiment, the order of court reporters displayed to the user at block 406 on any particular computer device 200 may optionally be based on statistical data from particular judges, such as the average length of a particular judge's hearings. In this way, the server 104 can determine which court reporter already assigned to a particular hearing will be available for another attorney's hearing, which allows for live scheduling of court reporters that are in the same courthouse building 300 (or any other desirable building) as an attorney or user that is in need of a live court reporter booking or service provider for a legal job.

Figure 11:
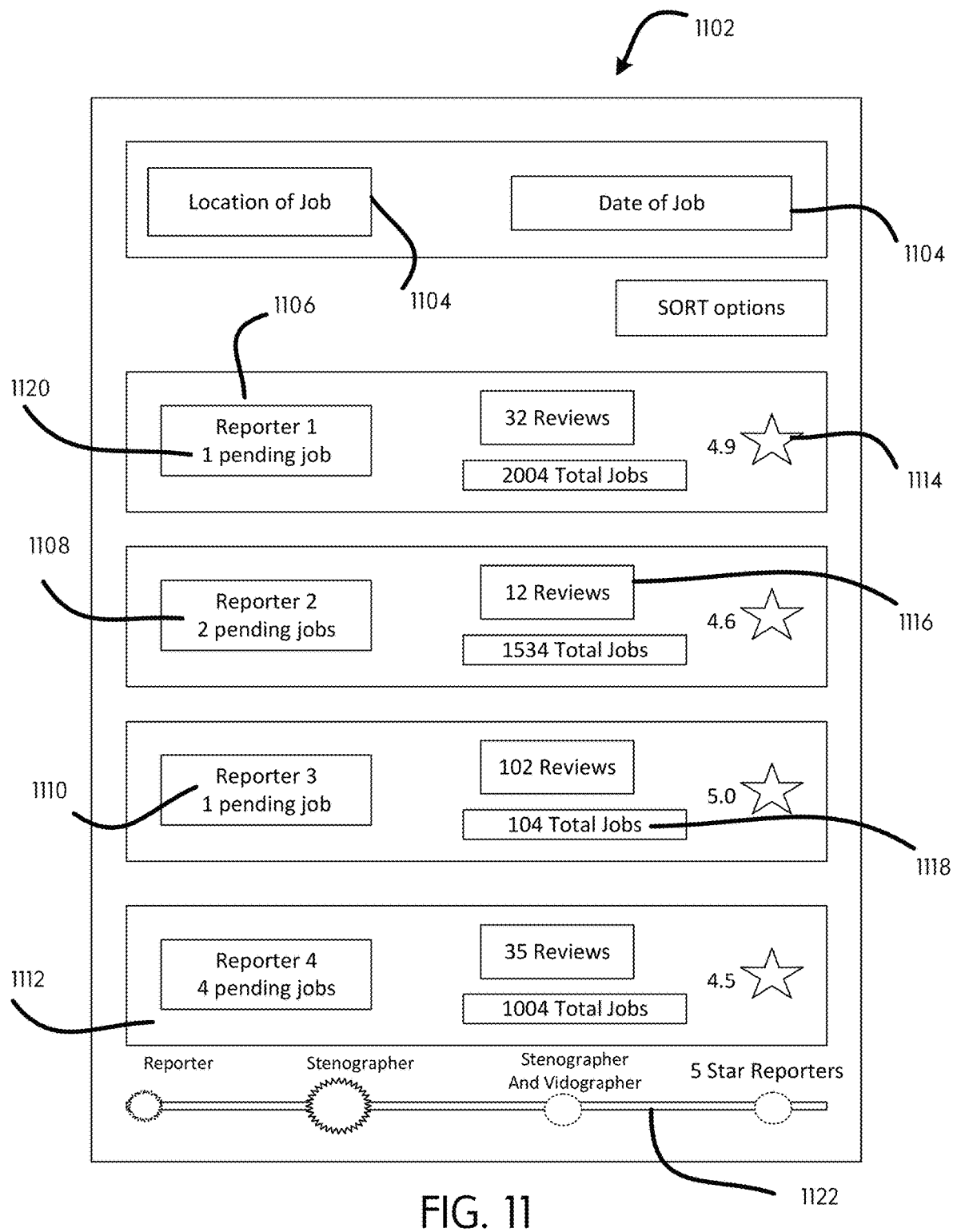
FIG. 11 is an exemplary device display interface for a user for selecting a job with a particular service provider in accordance with the principles of the present embodiment.

At block 408, which may be contemporaneous with blocks 404 and 406, the server 104 causes to display court reporters about a user's device based on previous instant user data from a particular user's account, law firm's account (containing data from one or more attorney users within the law firm) or global data from all users (See FIG. 11 for an exemplary interface displaying a plurality of court reporters associated to a plurality of court reporter device 114).

Figure 5:
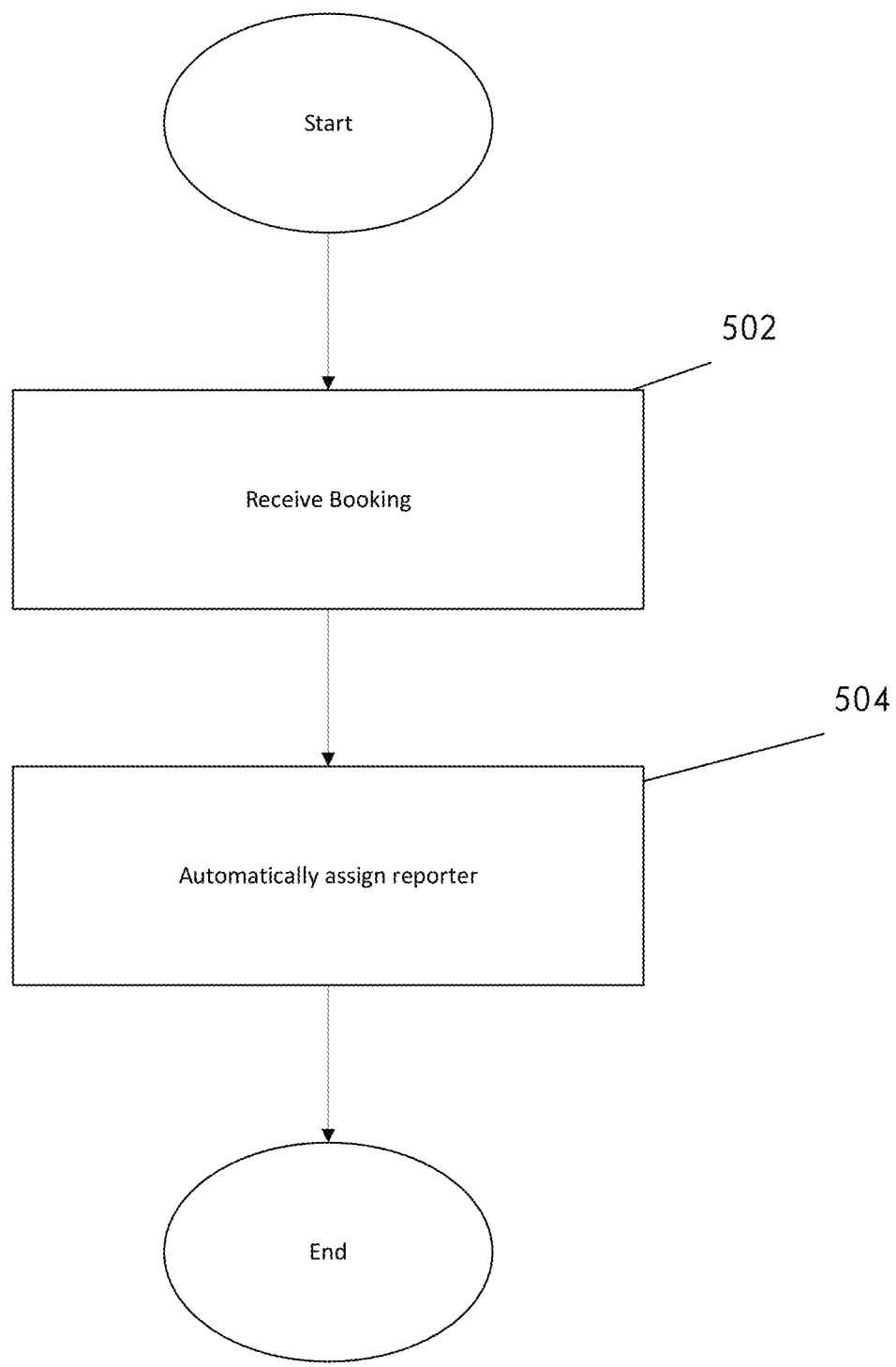
FIG. 5 is a flow chart of an exemplary booking process for automatically assigning via a server a court reporter in accordance with the principles of the present embodiment.

FIG. 5 is a flow chart showing an exemplary process for automatically assigning a court reporter that may be performed during an example operation of FIG. 1. At block 502 the server 104 receives a booking request from a user device, such as mobile device 102 or computer 106. At block 504, the server 104, or via a processor 202 from another computer device 200, assigns a court reporter to a particular job. In one non-limiting embodiment, court reporters are auto assigned by servers in order. As a court reporter finishes a job, the reporter is then assigned a reporter. Reporters may be cued and as a reporter finishes a job by selecting End Record 1006 (FIG. 10), the reporter may be assigned or requested for another subsequent job for that day at the same, similar, or different location.

In one non-limiting embodiment, users of device 102 may be offered premium pricing options. Premium pricing options may include selection between different options that adjust prices based on a number of factors. For example, premium pricing may be provided for having the option to select a particular service provider, such as a particular court reporter, videographer, or process server, as opposed to having an automatically assigned court reporter assigned to the job. In one embodiment, an automatically assigned service provider is defined as a service provider that accepts the available job, as described herein. In one embodiment, an automatically assigned service provider is defined as a service provider automatically assigned to the legal job via a request received by the server 104.

In one non-limiting embodiment, premium pricing may be based on average length of time of a type of an event by the attorney or account holder, such that the user that typically has shorter event times are charged a premium. In another premium pricing example, average cancellations may affect (with or without other factors) may affect the price of the event. Average cancellations within a time period or other factors may also be used for premium pricing.

In one non-limiting embodiment, discounts may be applied by the server 104 for a number of factors, such as a particular percentage of cancellations (for example, cancellations below 10%), average length of events greater than a determined percent, or some combination of factors thereof.

Figure 6:
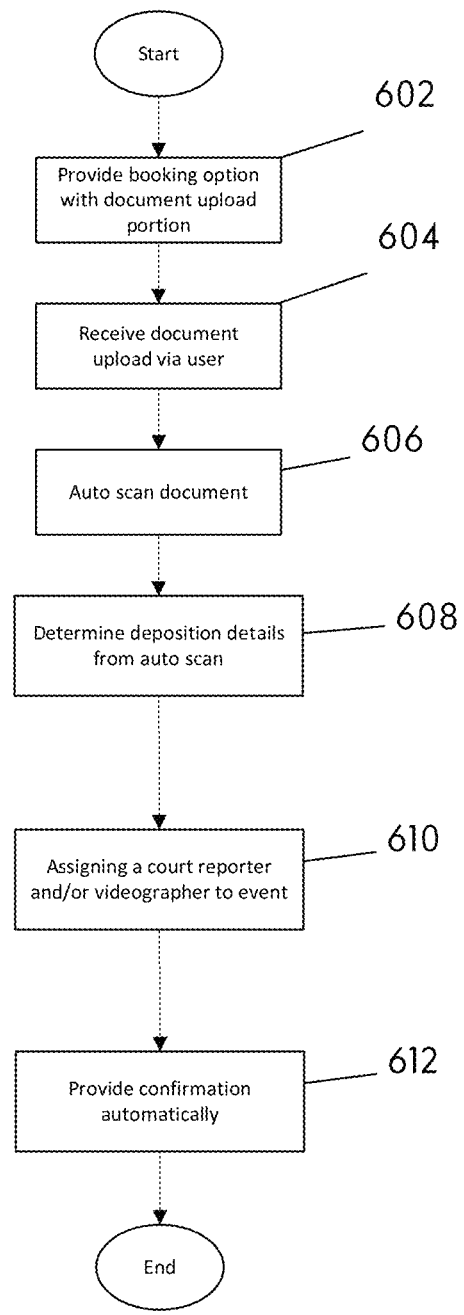
FIG. 6 is a flow chart of an exemplary booking process for scanning a document for determining pertinent event information in accordance with the principles of the present embodiment.

FIG. 6 is a flow chart showing an exemplary process for automatically scanning and assigning a court reporter. At block 602 a booking option with a document upload portion is provided to a user. For example, a website may include a form with an option to upload a document. Alternatively, a booking option may be provided via an email with a document attachment. At block 604, the server 104 receives the document upload via a user's mobile device 102 (or the document may be received by other means such as via receipt of an email or the service may otherwise receive the document or document information, including from the database 110 or other means). The document uploaded via the mobile device 102 to the server 104 is automatically scanned via the server 104 at block 606 for extracting information from the uploaded document. At block 608 information is determined via a processor 202 for determining details from the automatic scan. During the automatic document scan, the processor 202 will determine pertinent event information from that document such as the court style, case number, service list including without limitation a service list found in the certificate of service, filing party, judge, additional parties (e.g., other parties expected to be present at deposition, trial, etc.) date of event such as the date, time, (or any other requests) and location of the event, such as a deposition, Examination Under Oath (EUO), Independent Medical Examination (IME), Compulsory Medical Exam (CME), trial, arbitration, or other event requiring or desiring a transcript or video record of the event. The information extracted during the automatic document scan is stored in a computer-readable medium 204. At block 610, server 104 (e.g., via processor 202) will cause to assign a court reporter and/or videographer from database 110. At block 612, the server 104 causes a confirmation to be sent to the filer, person(s) listed on the signature block, and/or persons listed on the certificate of service, confirming the booking. In an embodiment, the server 104 will provide confirmation of the event booking to the court reporting mobile device 114.

In one embodiment, the server 104 will provide confirmation of the particular assigned reporter either at or near the time of the event. The server 104 will identify the legal service provider and provide adequate notification to the service provider before the event.

In one embodiment, the notice document is sent automatically via the server 104 to the process server to serve non-parties of an event.

In one embodiment, the court reporter is assigned in real time, alerting the court reporter of the job, via alerting over the court reporter mobile device 114, including SMS message, text message, email, mobile app alert, and other confirmation.

In one embodiment, the court reporter receives the assignment and thereby has the option to accept or reject the job. The court reporter may receive via their legal service provider mobile device 114 user data from the user to aid in the determination of whether or not to accept the assignment. The user data could include without limitation user ratings as made by prior court reporters via court reporter mobile device 114 following prior jobs, statistics related to cancelled jobs, statistics related to transcript orders following the completion of jobs, and other like user data.

Statistical data stored in database 110 can be processed and provided to users to inform the user about important statistical information related to prior hearings before a particular judge, including the average wait time, average length of hearings, and average cost of transcripts. This statistical data can be used in processing and determining the assignment of court reporters and videographers to events and/or to a particular attorney and/or law firm via server 104.

Figure 7:
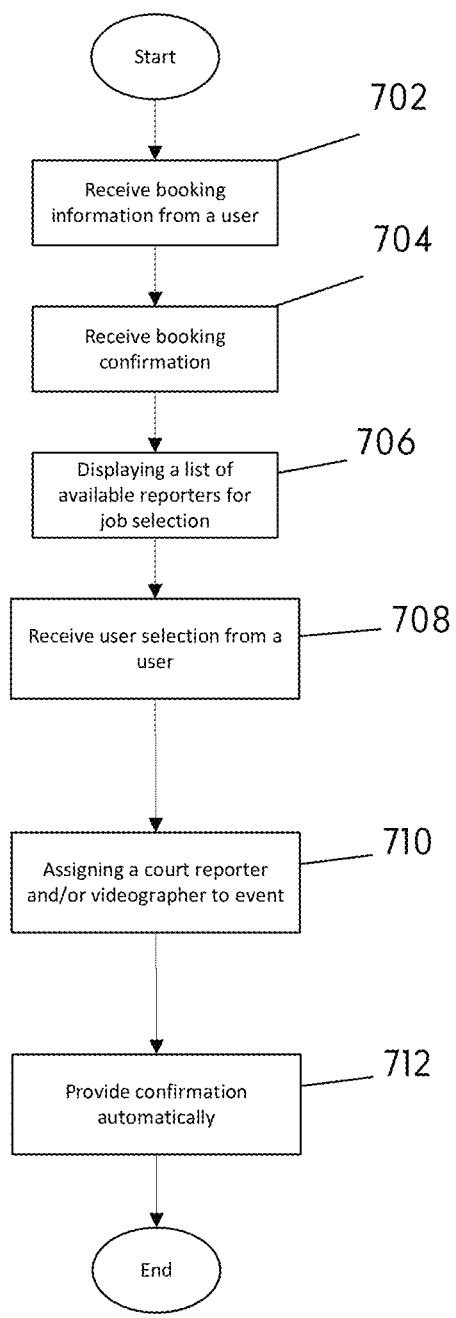
FIG. 7 is a flow chart of an exemplary booking process for selecting a court reporter for a job in accordance with the principles of the present embodiment.

FIG. 7 is a flow diagram of an exemplary embodiment of a method of booking a court reporter. In this embodiment, a server receives booking information for a job from a user at Block 702. Booking information can include without limitation the day and time of the job, the location of the job, the need for an interpreter and the language of the requested interpreter, the parties relating to the job, the case number relating to the job, certificate of service information relating to the job, and the like. At block 704, the booking information is confirmed by the user. An option is presented to the user such that the user may select from a list a particular court reporter for the job at block 706. Still at block 706, the user is shown graphically on a screen a plurality of court reporters based on that user's data. Such user's data may include information based on past user experience with that reporter. For example, the user's data may include one or more ratings that the user assigned to the reporter, such as a star rating. The user's data may include a single star rating of the court reporter, or may include a combination of ratings for multiple rated aspects of the court reporter. The display of court reporters to a user may be based on solely that user's data or may alternatively be based on global user data of a plurality of users. The user selection is sent over network 108 from the user's mobile device 102 or computer 106 to the server 104 at block 708. In one non-limiting embodiment, the selection is provided to the court reporter via the court reporting mobile device 114 wherein the court reporter can accept or reject the event. The court reporter may be presented with statistical data, such as the statistical cancellations of the attorney and/or law firm, length of events, such as all events or such as a determined group of events (e.g., a number of depositions). At block 710, a court reporter and/or a videographer and/or an interpreter is assigned to an event. At block 712, confirmation is send to the parties, attorneys, court reporters, videographers, interpreters, or the like.

Figure 8:
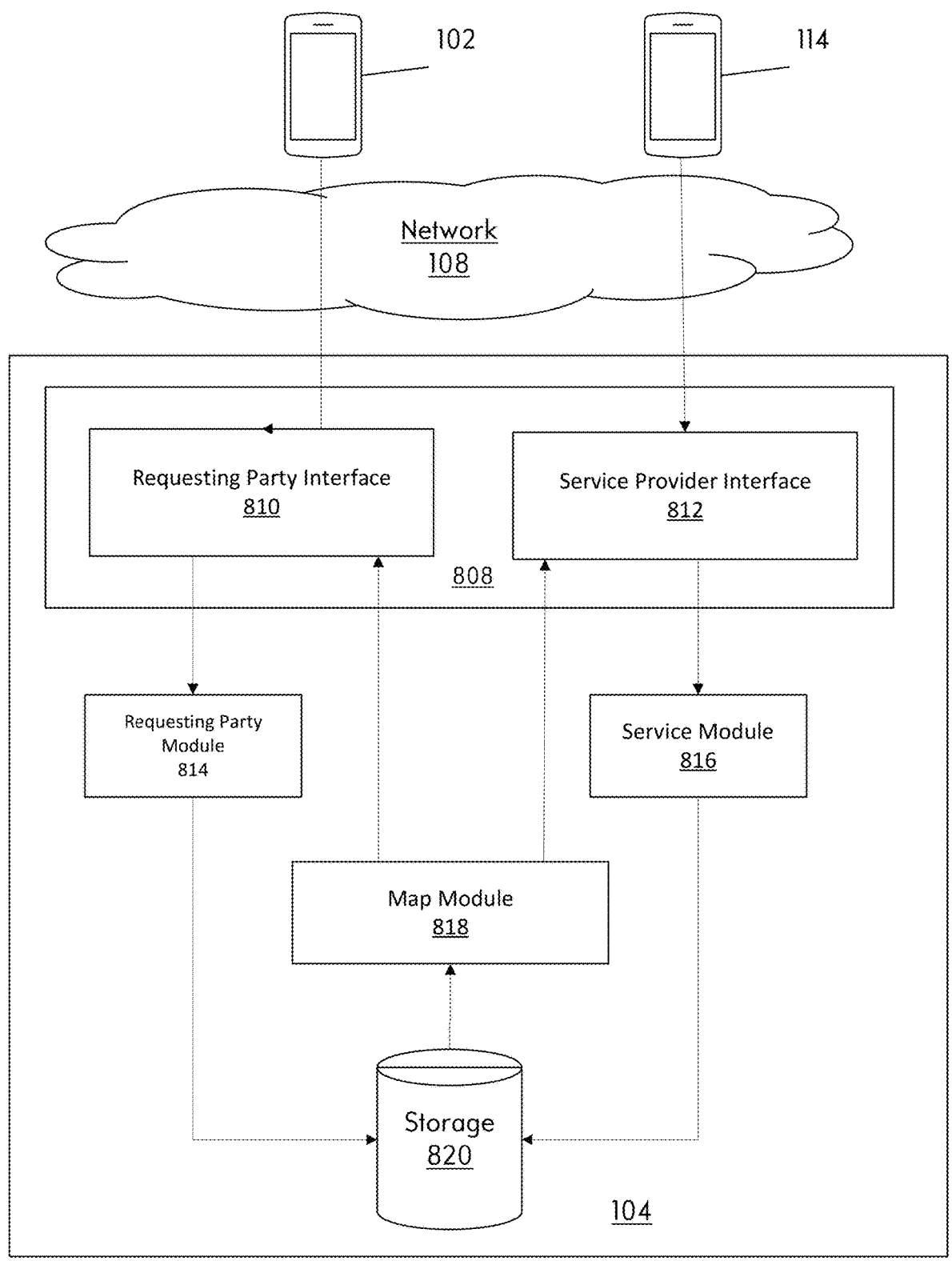
FIG. 8 is a block diagram of an exemplary event request network in accordance with the principles of the present embodiment.

Referring now to FIG. 8, an embodiment of the server 104 is shown having a device interface module 808, a positioning module with a requesting party module 814, a service module 816, and a map generation module 818. The server 104 includes or has access to one or more databases 820 for storing computer data relating to requesting party and service providing party, such as a law firm requesting service and a court reporter providing service. In one non-limiting embodiment, server 104 can provide on-demand live scheduling of the requesting party and on-demand live acceptance of a job and/or event by the service providing party.

The Server 104 operates as requested to schedule transcription services between one or more requestors (e.g., lawyers, legal staff, law firm, insurance company, and schools) and one or more service providers (e.g., court reporters, process servers, interpreters, and videographers). The instant embodiment can be implemented in various ways including on any device across the network (e.g. peer-to-peer networks) and can be implemented on other network architectures and systems, and on as devices described herein.

In a non-limiting embodiment, through requesting party device 102 operate an application that communicate with interface 810. Likewise, service provider mobile device 114 uses an application that communicates with service provider interface 812. According to some non-limiting embodiments, the applications can use or otherwise include an application programming interface (API), to communicate with the device interface module 808.

Through the device interface module 808 and its requesting party interface and service provider interface 810, 812, the server 104 can receive data from the requesting party device 102 and service provider device 114, respectively, from any number of requesting party device and service provider device 114. Each requesting party device 102 may provide to the server 104 a number of information, including event location, for service by the service provider (e.g., court reporter), name, identification information, telephone number, email address, and/or current positioning information of the requesting party device 102, type of service requested (immediate service versus same day delayed service versus future day delayed service). Likewise, one or more service provider device 114 provide data to the server 104 including name, identification information, telephone number, email address, current positioning information of the service providing device 114, type of equipment of the service provider (e.g., digital court reporting equipment versus stenographer machine versus videographer equipment versus type of audio recording equipment), the availability of the service provider (e.g., the currently set status of the service provider device 114 by a court reporter), the availability status of the current service provider via the set status through the service provider device 114 (e.g., set status to currently reporting court hearing before a judge, waiting in judges chamber and/or court room, reporting deposition). The current positioning information may include GPS coordinates or data.

According to one non-limiting embodiment, the requesting party data and the service provider data sent from the device 102 and 114 can be received by the server 104 in any order. Data from the device 102 and 114 can be updated and sent to the server 104 on a continuous basis continuously to update without limitation on status and location of the service provider device 114.

The position of one or more of the plurality of requesting party data and the service provider data of requesting party device 102 and service provider device 114 may be associated with a geographic region. Map data can be calculated by a map module 818 for determining geographic locations of the plurality of device 102 and 114, the map module 818 can place the plurality of device 102 and 114 in regions such having a determined size, geographic radius, shape, or the like. The map module 818.

In one non-limiting embodiment, the server 104 can calculate and predict the availability of a reporter based on a number data points, including historical data and real-time data. For example, if a court reporter is waiting for a hearing to begin, the server 104 can calculate the predicted time that the court reporter, associated with a particular service provider device 114, will be ready and available for a follow-up job and/or event. The real-time data of other court reporters associated with other service provider device 114 can be used to calculate availability of other reporters because many times multiple court reporters are waiting for a particular judge. In this manner, the server 104 can change reporter jobs on the fly to accommodate judges that are late or delayed, such that the server provider device 114 can inform multiple reporters to switch jobs to best serve the requesting attorneys via their requesting device 102.

The server 104 can also use historical data from storage and/or database 820 to predict the availability of reporters on a particular date and/or time.

The server 104 can alter the size, shape, radius, or other information related to regions and/or sub-regions based on any of, or a combination of, real-time data, historical data, or other data.

Figure 9:
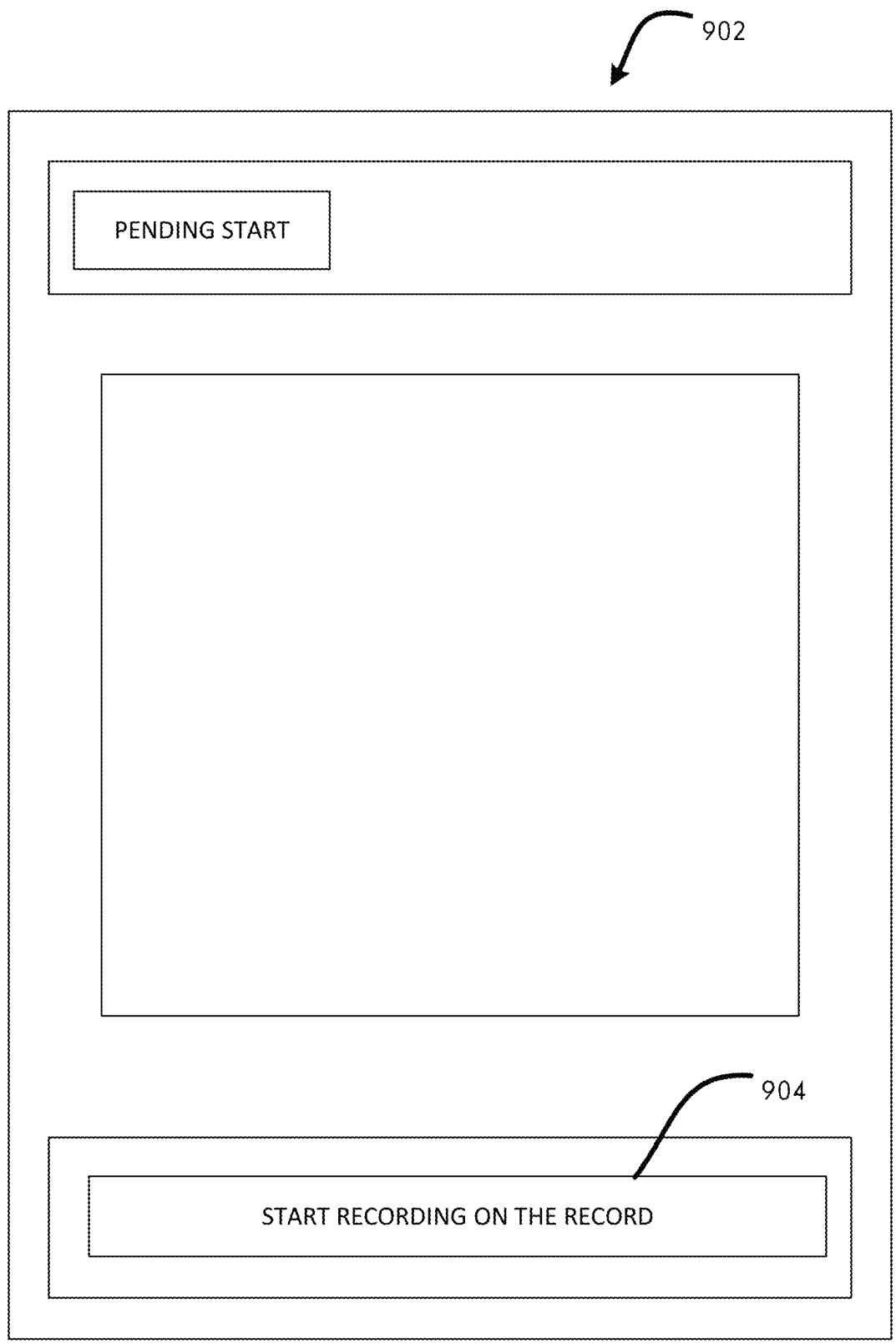
FIG. 9 is an exemplary device display interface for a user for starting an event in accordance with the principles of the present embodiment.

Referring now to FIG. 9, a service provider interface, and particularly in this illustration is an exemplary court reporter interface 902. The reporter interface 902 includes a touch screen button 904 allowing the user to touch the screen and start the reporting. When the reporting is started, a time stamp is recorded. The start time may be provided to the server 104. The particular reporter device 114 and its associated user account may be marked as busy during the duration of the job, until the reporter ends the job (See FIG. 10).

Figure 10:
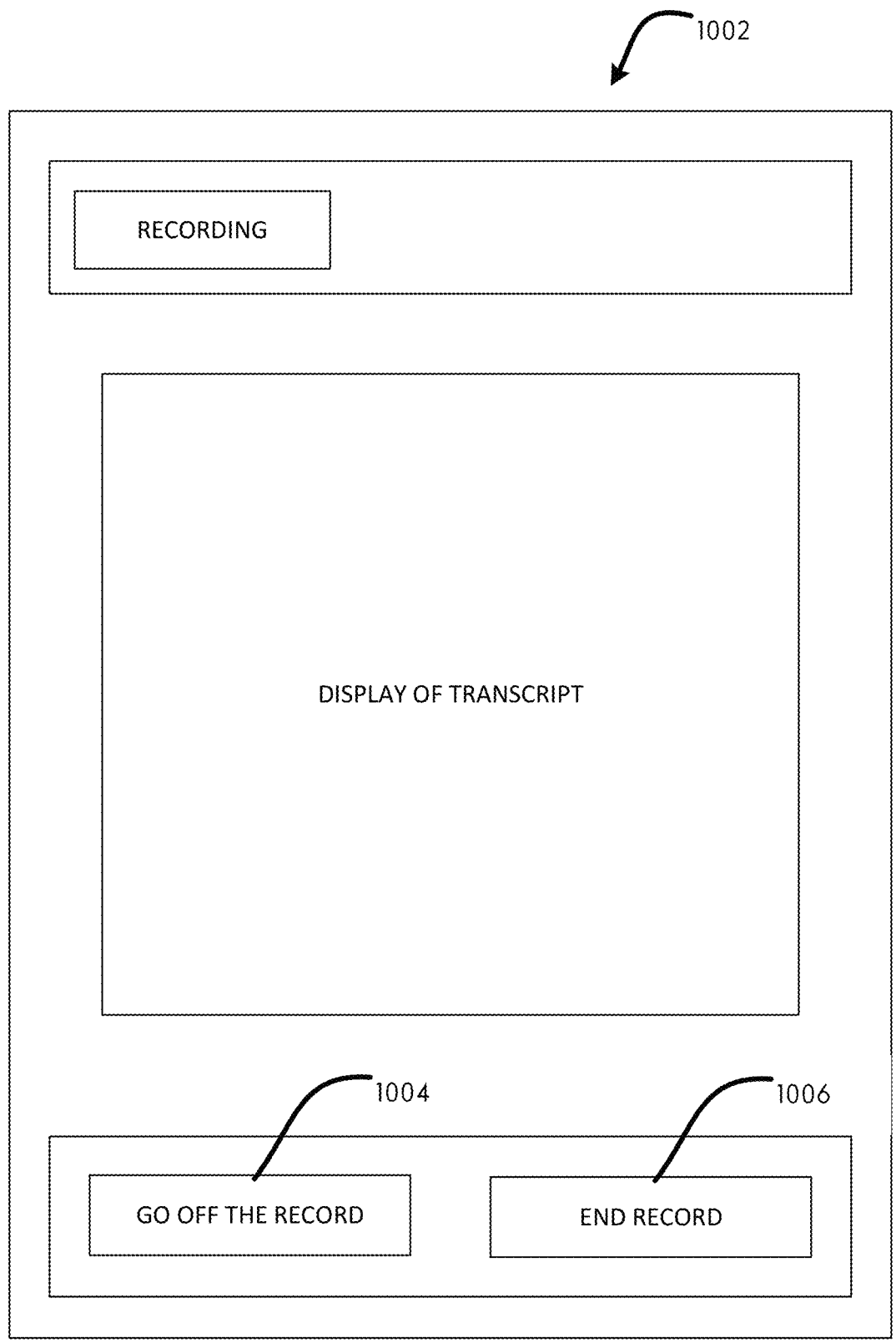
FIG. 10 is an exemplary device display interface for a user displaying a presently recording event in accordance with the principles of the present embodiment.

Referring now to FIG. 10, an exemplary reporter interface 1002 is shown. In the instant illustration, the reporter and/or user of the device 114 selected the record button (See FIG. 9). The reporter has the option to touch the screen of the device 114 to go off the record. Selecting the button 1004 to go off the record will provide a new button to allow the reporter to go back onto the record and continue the recording. When the reporter starts reporting by pushing the start button 904, the device 114 may start recording sound onto the device 114. At the end of the reporting job, the reporter will push the end record button 1006 on the device 114. When the end record button 1006 is pushed, the voice recording will end and the sound recording will upload to the server 104 or other cloud storage. The end time of the recording is recorded and saved along with the job start time.

In one non-limiting embodiment, when the end record button 1006 is pushed or otherwise selected, the audio clip of the job will be automatically sent to the service email(s) provided or otherwise made available to the user via a user account portal, or via a mobile app. For example, the audio clip may be automatically emailed to the Plaintiff's attorney(s), Defendant's attorney(s), clients, insurance companies and insurance adjusters, and the like. The audio clip may be sent immediately or alternatively may be delayed, such as delayed until payment is confirmed or received.

In one non-limiting embodiment, when the audio is uploaded to the server 104 and/or cloud storage, the audio clip of the job will be automatically sent to one or more parties, including at least one of the Plaintiff's attorney(s), Defendant's attorney(s), clients, insurance companies and insurance adjusters, and the like. In one embodiment, stored credit card information may be charged for the audio file and/or for the job. In one embodiment, at the conclusion of the job, the user and/or users are charged for the reporter based on a pre-determined rate, the rate is calculated with the total job time for determining the total charge.

In addition to or alternative to in a non-limiting embodiment, the audio clip may be substituted for a video clip with audio that is recorded from the service provider device 114. In such an example, the video clip may be sent automatically at the end of the event/job and/or uploaded to a database 110.

In an embodiment, the sound recording from the device 114 is immediately sent to the attorneys, law firms, insurance companies associated with the particular job and/or event.

Referring now to FIG. 11, an illustration of a job selection interface 1102 is shown. The requesting party, typically an attorney, attorney's staff, or insurance company, will add the location of the job via a job location button 1104, and add the date of the job via the job date button 1106. The requesting party will review on their requesting device 102 a request interface via information provided via the server 104, or other outside data source. In this non-limiting embodiment, the job interface 1102 provides one or more reporters to the requesting party via the job selection interface 1102. Reporter 1 box 1106 is provided on the device 102 for providing information about reporter 1. Likewise, Reporter boxes 2-4 additionally show information particular to those specific reporters. The one or more reporter boxes 1106, 1108, 1110, 1112 may optionally show the location, the number of pending jobs 1120, prior reviews 1116, total number of prior jobs 1118, and a user rating, such as a star rating 1114. Clicking on the prior reviews may optionally allow the user the ability to read the one or more reporter reviews. A selector bar 1122, or other selection means, allows the user to select between different options, for exemplary purposes, the user can select between a reporter, such as a digital reporter, a stenographer with a stenograph machine, a reporter and a videographer, and a reporter that has a particular star rating.

Figure 12:
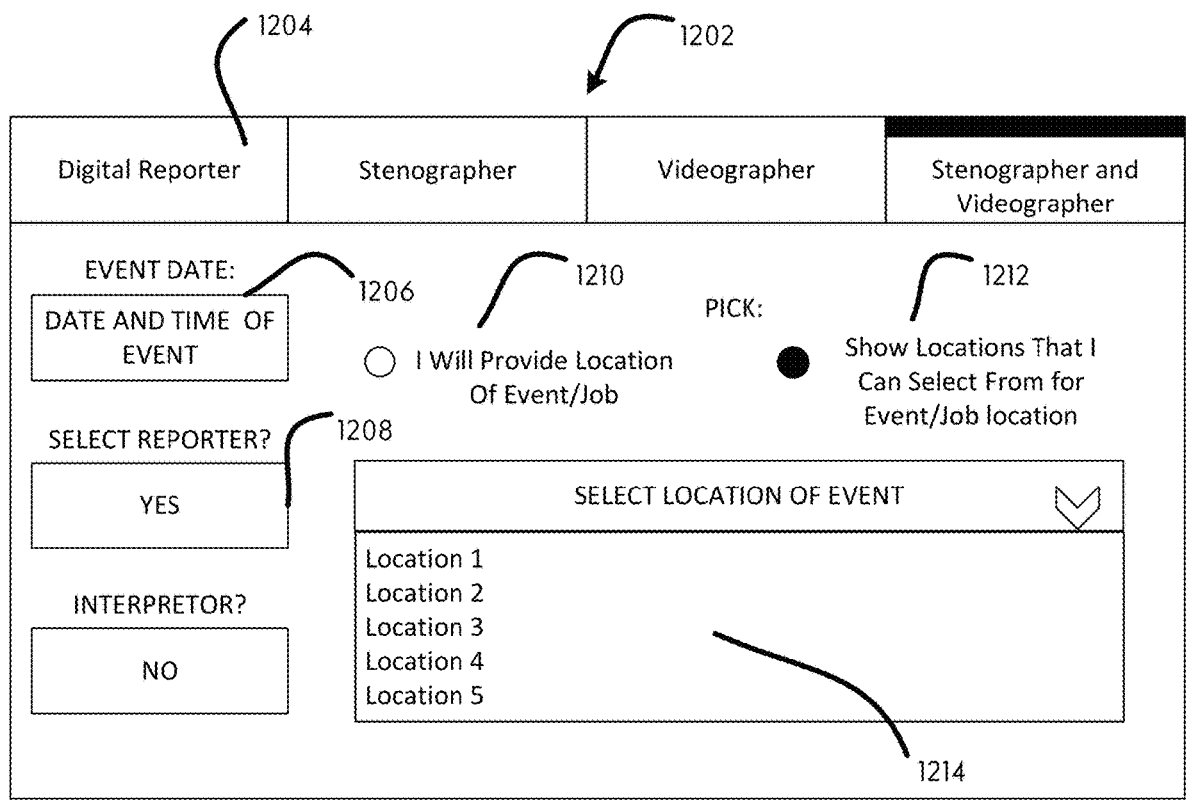
FIG. 12 is an exemplary booking interface for requesting a job in accordance with the principles of the present embodiment.

Referring now to FIG. 12, a booking interface 1202 is shown, the booking interface provides for selection means 1204 for selection between digital reporter, stenographer, videographer, interpreter (not shown), or a combination thereof. The user is provided with a date selection means 1206 allows for the selection and/or entry of the date of the event. The user is provided with a person selection means 1208, such that a 'yes' selection will provide the user with a list of reporters, interpreters, and/or videographers for selection thereof. The user may optionally be able to sort persons available for selection by particular data, such as star rating, total number of prior jobs, types of prior jobs (personal injury, med. mal., products liability, wage and hour, patents, trademarks, defamation, etc.).

The user has the option to provide the location of the job by identifying the job location 1210 or alternatively the user can select that they need a location 1212. When the user identifies that they need to select a location for the job, a list of locations 1214 may be shown to the user. The list may show locations based on information entered by the user, such as a desired deposition location. The desired deposition location may be entered by the user initially, for exemplary purposes, as a zip code or as a city.

In an embodiment, entering data relating to the desired location will access, via an API, a server with access to a nationwide meeting room booking system for providing locations with available meeting room space for the requested date and time. The server may provide data for graphically displaying available office locations that can be booked for a specified time period. The graphical depiction of the meeting room space may include pictures of the meeting room, as well as the cost of the meeting room per hour or total cost for the identified total length of time or both.

Figure 13:
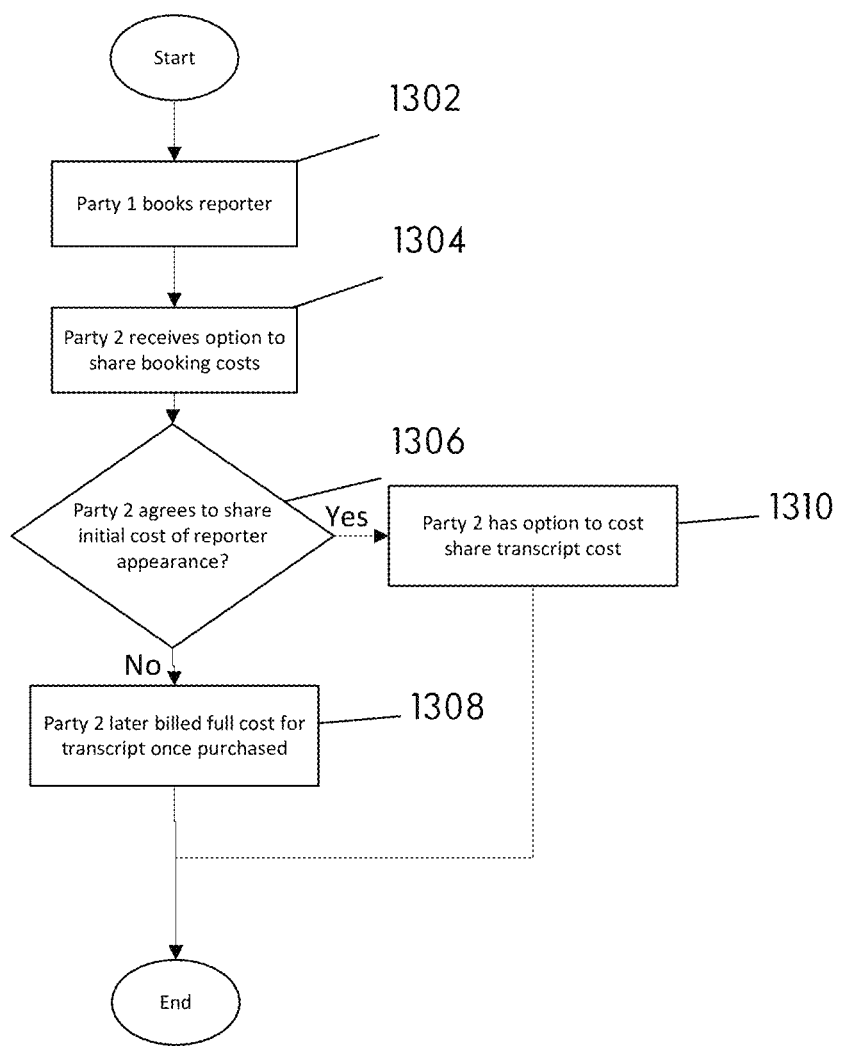
FIG. 13 is a flow chart of an exemplary cost sharing process for an event in accordance with the principles of the present embodiment.

Referring now to FIG. 13, an illustration shows a cost sharing method. At block 1302, a first party books a court reporter. The first party may include the attorney, staff, insurance company, or other users. At block 1304, a second party, such as opposing legal counsel, or the opposing party's staff, insurance company, or the like, receives the option of sharing the cost of the reporter's appearance. At block 1306, party 2 determines whether or not it wishes to share the cost of the reporter. At block 1308, if party 2 does not agree to share the cost of the reporter appearance, then at block 1308 party 2 is charged full price when the transcript is later ordered. If party 2 agrees to share the cost of the reporter appearance, at block 1310 party 2 shares the cost of the transcript and/or is offered a discount for the transcript cost.

Figure 14:
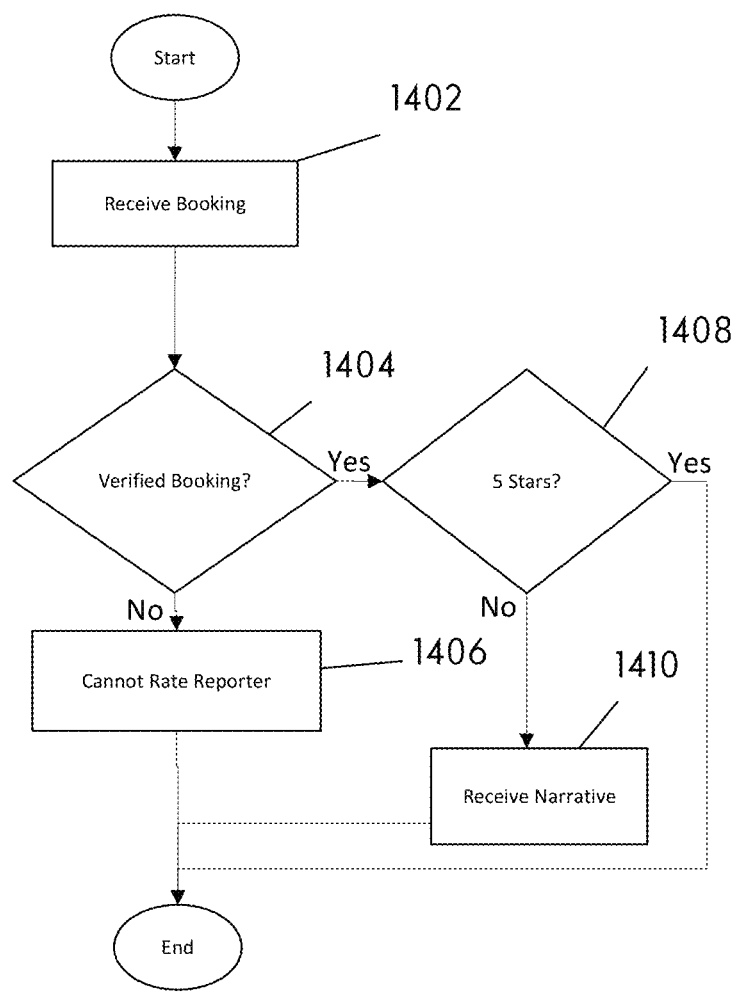
FIG. 14 is a booking process of an exemplary rating system in accordance with the principles of the present embodiment.

Referring now to FIG. 14, an illustration relating to the relating system is shown. At block 1402, a server 104 receives a booking from a user. At block 1404, it is determined via the server 104 whether the booking is verified. If the booking is not verified, at block 1406 the user that books a reporter is not able to rate the service provider, namely the court reporter, interpreter and/or videographer. At block 1408, a determination is made whether 5 stars was provided. the If the user rates the service provider with 5 stars, the user optionally can leave a narrative. If the user rates the service provider less than 5 stars, then at block 1410 the user must provide a narrative as to why a rating of less than 5 stars was given for the particular service provider.

In an embodiment, when a user selects multiple service providers including court reporters, interpreters, and/or videographers, the user is given the option to rate each of the service providers for that particular job. Alternatively, in one embodiment, the user is given the option to rate less than all of the service providers for any particular job.

Figure 15:
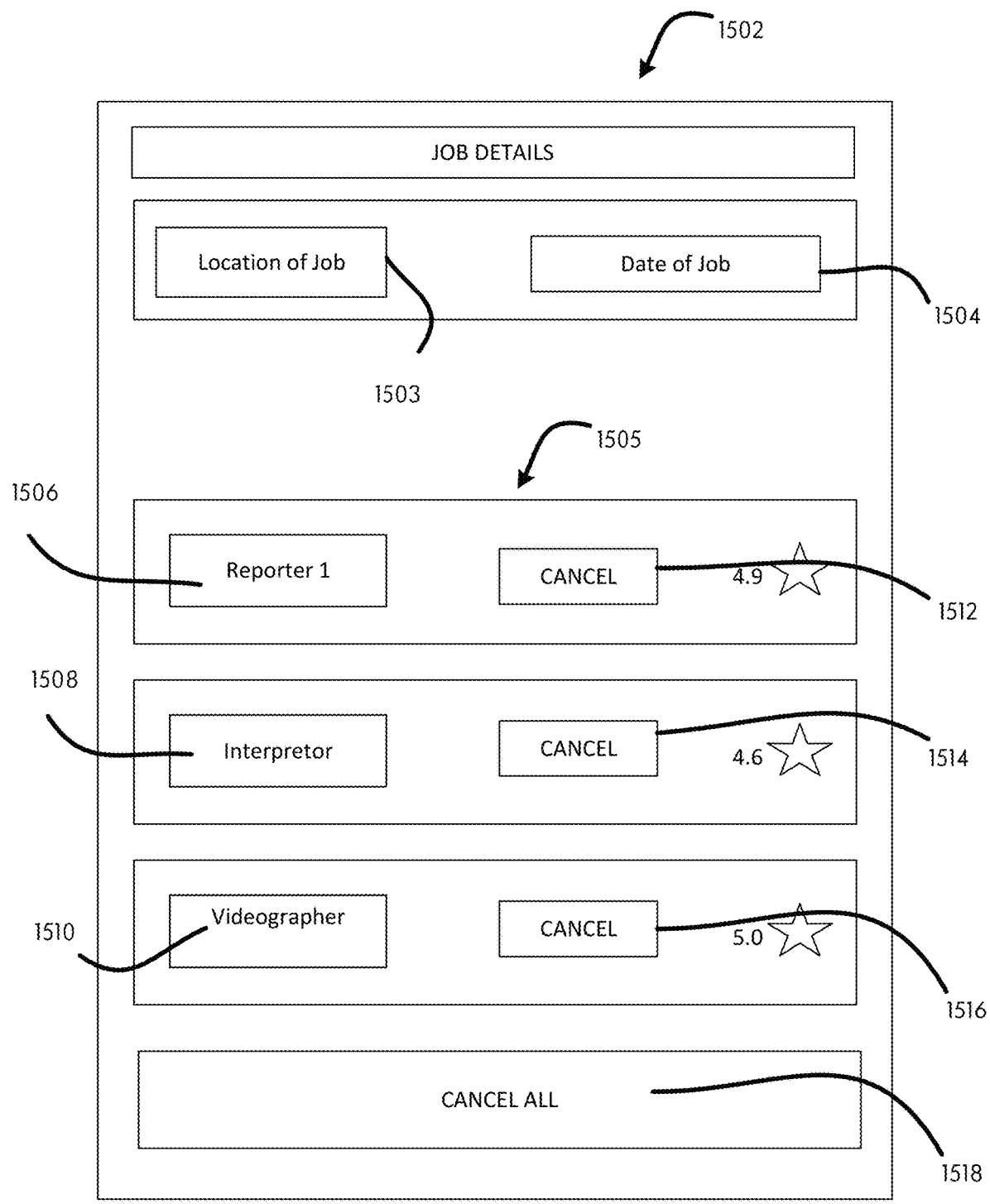
FIG. 15 is a job detail interface showing details of a particular job in accordance with the principles of the present embodiment.

Referring now to FIG. 15, an illustration of a job detail interface 1502 is shown. The job booking interface 1502 is displayed on a user device 102 displaying job details. The job details may include the location of the job 1503 and the date/time of the job 1504. The job booking interface 1502 includes a list of the requested service providers 1505. For example, the job shown includes a court reporter 1506, an interpreter 1508, and a videographer 1510. The user has the option to cancel individual service providers via cancellation buttons 1512, 1514, 1516. Alternatively, the user has the option to cancel all the entire job by selecting the cancel job selection 1518. If the job 1502 and/or particular legal service providers 1506, 1508, and/or 1510 is canceled within a predefined, such as within two hours from the job, then the user is immediately charged a cancellation fee to the user's account, including via a credit card. If the job 1502 or a particular service provider is canceled within the job cancelation window, the user is not charged a cancellation fee for any or all of the service providers 1506, 1508, 1510 assigned to the job 1502. At any point that a cancellation is received, a confirmation email of the cancellation is provided. Optionally, all parties on the certificate of service can be notified.

Alternatively, the user can file a cancellation notice with the court and include a designated email address on the service list. That designated email address will receive the filed notice of cancellation of the deposition, which will be read automatically on server 104. The server 104 may then determine which job was cancelled by reading the caption of the case and the date of the job, and such cancellation will be updated in the database 110. Subsequently, a cancellation notice may be sent to all parties from the server 104 confirming the cancellation.

Figure 16:
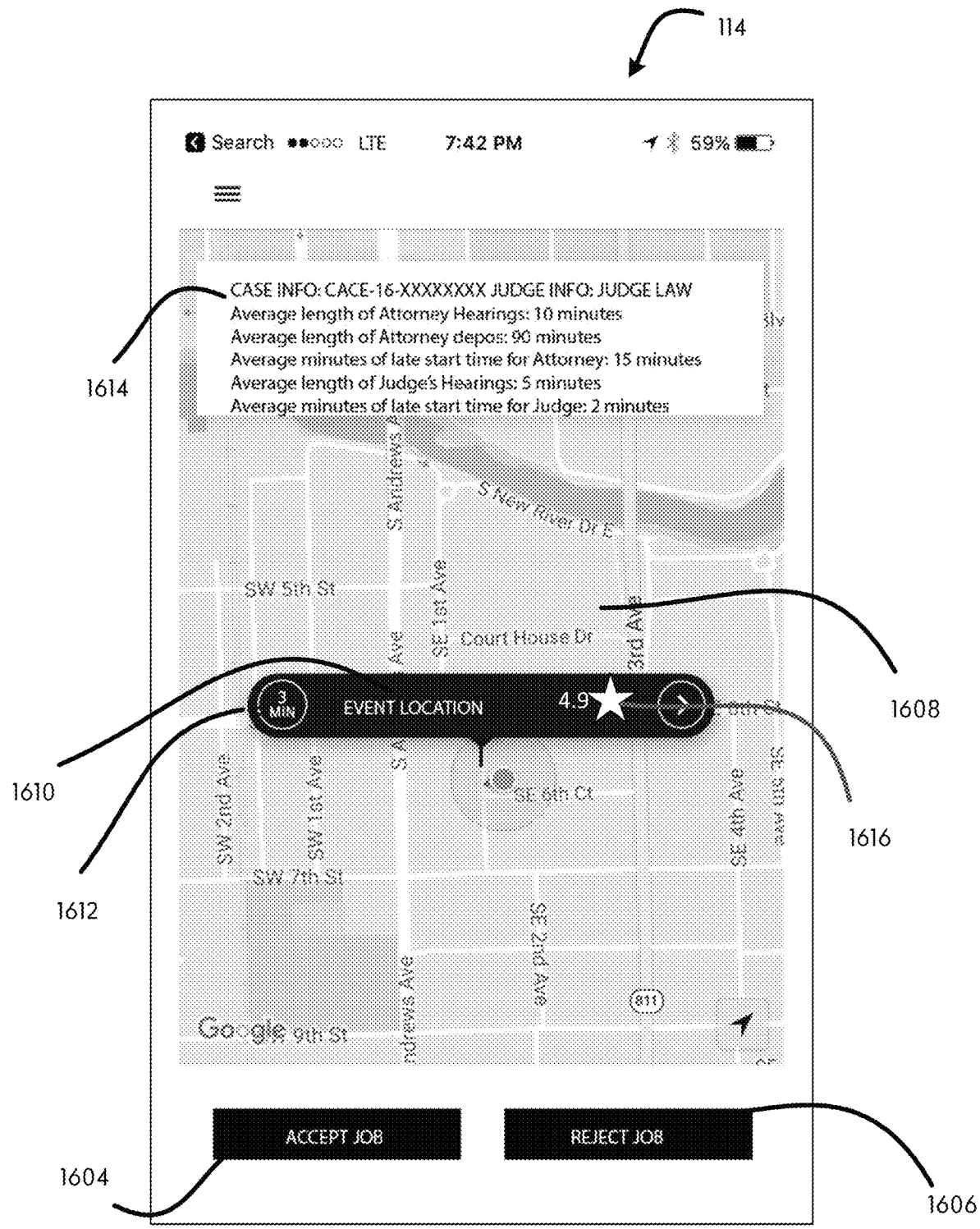
FIG. 16 is a job selection interface displaying a job for acceptance or rejection in accordance with the principles of the present embodiment.

FIG. 16 illustrates an embodiment of a device interface having one screen shot of a court reporter device 114, the court reporter device receives a job request assignment, the court reporter may accept or reject a job request by selecting (e.g. selecting via a touchscreen device) on device 114 an accept button 1604 or a reject button 1606. The rating 1616 of the job requestor may be provided.

Figure 17:
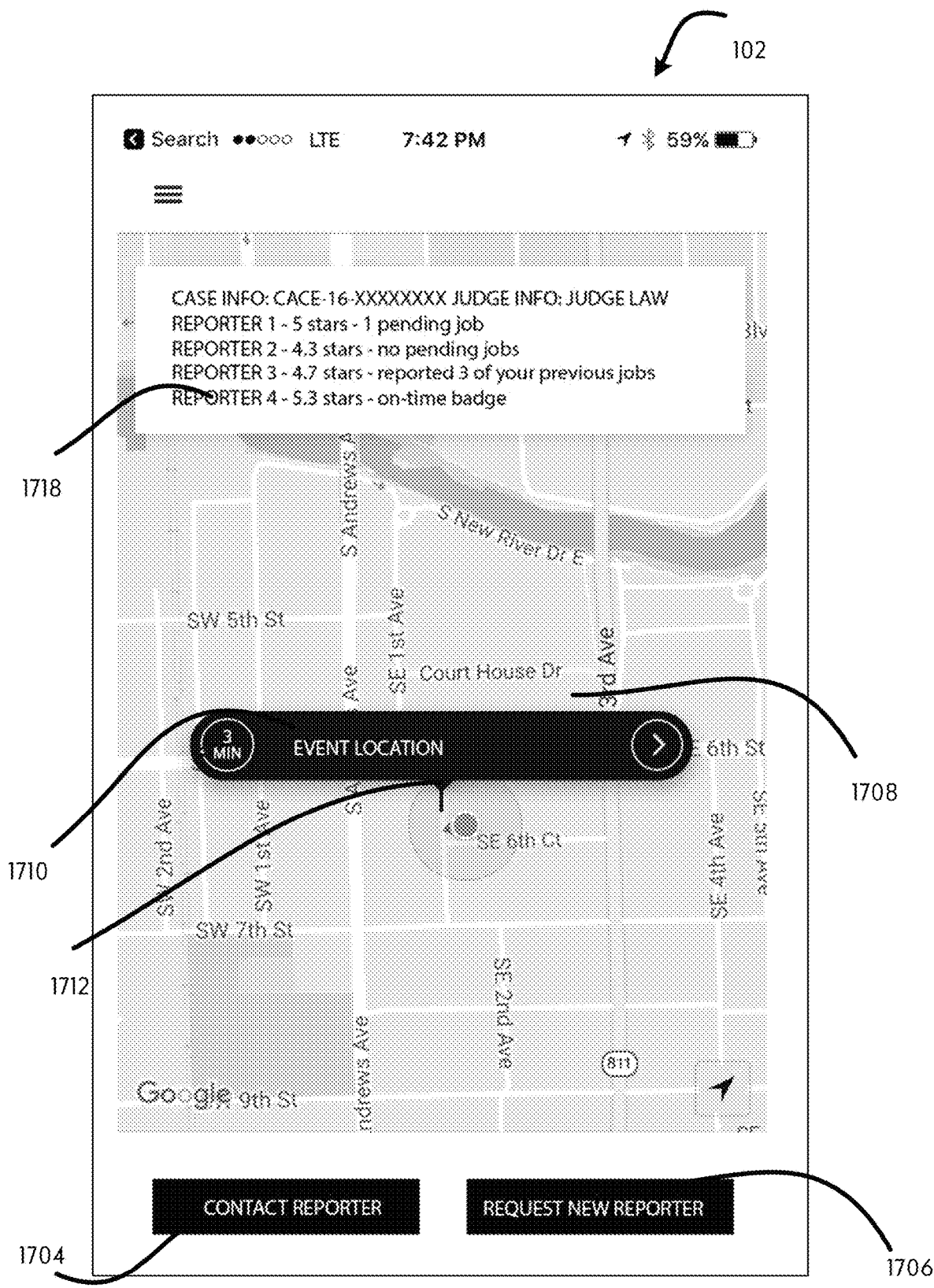
FIG. 17 is a job detail interface displaying a selected job in accordance with the principles of the present embodiment.

FIG. 17 illustrates a job detail interface displayed about a device 102. The job detail interface particularly shows a scheduled job. The job detail interface allows the user or attorney to contact the presently scheduled reporter or service provider by selecting button 1704. The user or attorney can select a new legal service provider request button 1706 to allow selection of another service provider. Selecting a new service provider may provide an additional provide advising and requesting payment of a fee or penalty. The other service providers available for selection may be shown in a selection box 1718 along with details related to the available service providers. The location 1712 of the event is shown and the time until the start time 1710 is shown on a map 1708. In one embodiment, when request new reporter button 1706 is selected, the server 104 will communicate with the service provider device 114 to determine whether the service provider is estimated based on location data and/or present driving conditions whether the reporter will be on time. If the server 104 determines that the reporter will be on time based on location data, the new service provider may be denied or delayed. In one embodiment, requesting a new reporter will ping the service provider device 114 allowing the service provider to select whether they will or will not be on time to the event.

In one non-limiting embodiment, the job may be displayed for acceptance or rejection on multiple device 114 and accepted on a first come/first to accept basis.

In one non-limiting embodiment, the job may be displaying on multiple device 114 in parallel such that the job is displayed on a first device 114 until accepted, rejected, or until a determine time has lapsed. The job may then be displayed on a second device 114 until accepted, rejected, or until a determine time has lapsed. The job may then be displayed on a next device, and so on, until the job is accepted.

The device 114 displays to the reporter and/or user the job. The job may be displayed graphically such as on a map 1608. The event location 1610 is displayed on the map 1608. The map may include a diagraph of the floor. The display 210 on the device 114 may output the length of time 1612 of arrival from the current location of the reporter (3 minutes in this example). User data may be displayed on the device 114 for allowing the reporter, which may or may not aide in deciding whether to accept or reject the job. User data 1614 displayed to the reporter may include the type of event (e.g., depo, video depo, hearing, trial, etc.), average length of time of that event such as the requesting attorney's hearings, average length of attorney depo, average minutes of late start time for attorney, average length of judge's hearings, average length of minutes of late start time for judge, particular delay of that judge for that day, the way in which the particular judge hears cases at hearings or other events (e.g., first to arrive, prior scheduling order when scheduled by attorney and/or their staff, assigned order, etc.). Any and all useful data may be displayed to the Court Reporter and/or user of device 114. The court reporter may receive via their legal service provider mobile device 114 user data from the user to aid in the determination of whether or not to accept the assignment. The user data 1614 may further include limitation user ratings 1616 as made by prior court reporters via court reporter mobile device 114 following prior jobs, statistics related to cancelled jobs, statistics related to transcript orders following the completion of jobs, and other like user data. Statistical data stored in database 110 can be processed and provided to users to inform the user about important statistical information related to prior hearings before a particular judge, including the average wait time, average length of hearings, and average cost of transcripts. This statistical data can be used in processing and determining the assignment of court reporters and videographers to events and/or to a particular attorney and/or law firm via server 104, particularly when multiple reporters are available for a particular job. In one non-limiting operation, the server 104 can utilize real-time data from other reporters via their device 114 to determine and/or calculate delay times for particular judges and lawyers, which serves to allow the server 104 to determine which reporters to place, for example, a previously assigned reporter for a job scheduled 10 days prior can be assigned to another hearing at the same start time when the server 104 determines via a delay in start time by another reporter device 114 assigned to a hearing before the same judge. In other words, when a first reporter via a first device 114 is assigned to an event before a judge with a 9:00 am start time and a second reporter via a second device 114 is assigned to judge at a 9:15 start time, the server 104 may assign the second reporter to another hearing (such as another 9:15 hearing start time before another judge in the same building) because the first device 114 advises the server 104 of the delayed start time (e.g., at 9:15 that hearing may not have started recording allowing the server to determine that the hearing is running late). The server may request the reporters to identify and advise digitally through device 114 whether the event is running late, and in turn the server 104 may assign another reporter to anther event due to the delay. Alternatively or in addition to, the server 104 may eliminate a particular reporter from a job due to the delay of a particular judge or event projected start time, being early, late, or on time.

Users, account holders and service providers may be awarded badges, icons, trophies, or like rewards for display to other users or service providers. For example, a reporter with a certain number of 5 star ratings may be awarded a badge. These badges may simply exist to allow others to view or alternatively these badges and related data may be utilized and/or calculated and/or determined by the server 104 for placement, selection, or display to other users for job selection purposes. For example, service providers with a particular badge (e.g. 100 trial) may be elevated in terms of placement on a selection interface for event requests (e.g., selection of court reporter for upcoming trial).

Figure 18:
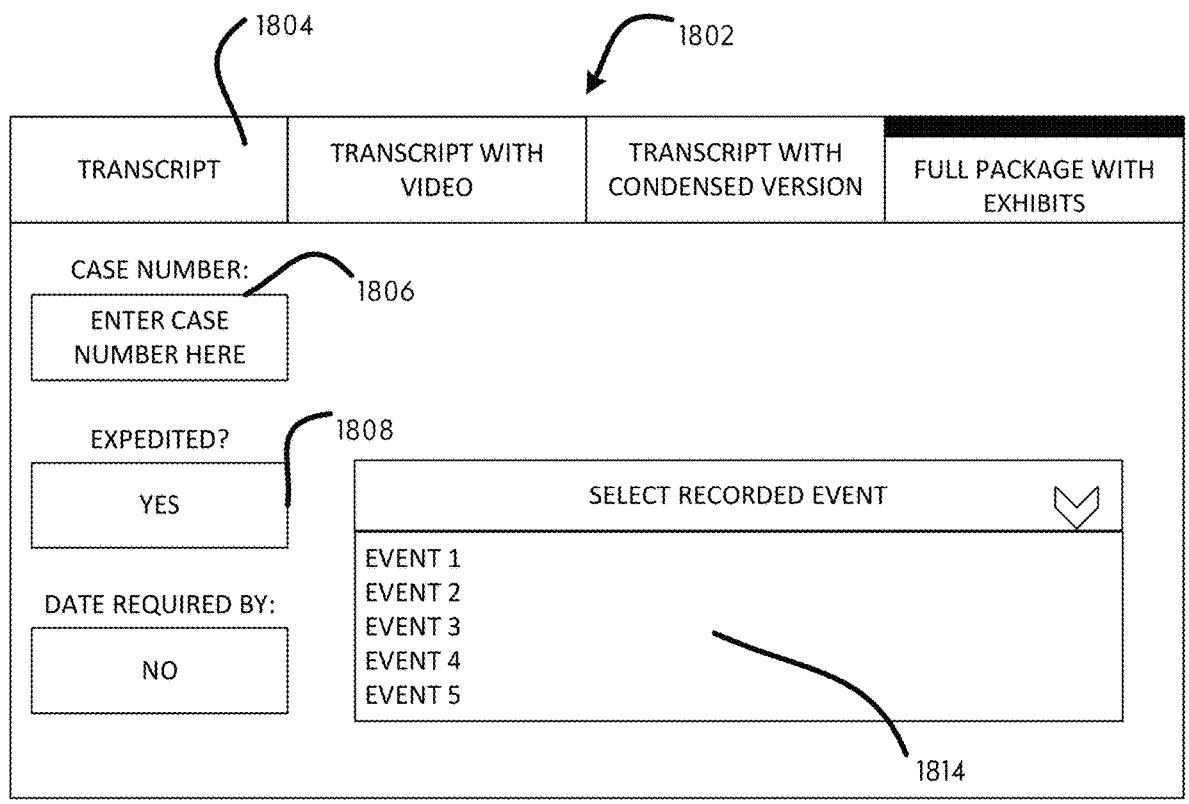
FIG. 18 is an exemplary job purchase interface in accordance with the principles of the present embodiment.

FIG. 18 illustrates an exemplary job purchase interface 1802 viewable on a device 102 and 106, the job purchase interface 1802 includes selection options 1804 for purchasing different options. In this example interface, the user has the option to purchase the regular transcript, a transcript with video, transcript with a condensed copy, or a full package with exhibits. The job purchase interface 1802 allows for entry of identifying information, such as a case number 1806, for displaying events for purchase. For example, when event identifying information is provided, such as a particular case, all events related to that identifying information is provided for purchase and/or re-downloading and/or resending. The job purchase interface 1802 provides a portion 1808 to identify a need for an expedited copy because the legal service provider, such a as a court reporter, may need to prepare the transcript or video (for example). In the event a copy is expedited, the user may identify the required date. Similar to the embodiments described herein that allows a service provider the option to select a job, service providers may be selected to finish the job, such as a service provider to finish the transcript for purchase. Subsequent to purchase selection by a user, other users or persons may be notified, such as via email, text message, sms message, mail, or the like for requesting whether additional persons, such as opposing counsel or insurance adjusters, wish to purchase a copy of the ordered transcript. Multiple events associated with identified case information may be displayed in an event portion 1814 having one or more events associated with the case identifying information. In this regard, the user can download previously purchased transcripts, can see whether opposing counsel or others ordered a transcript, can select which events to purchase, such as a particular deposition, hearing transcript, trial transcript or the like. In one embodiment, an option to select all is available to purchase all available event items.

In one embodiment, service providers with poor ratings may be demoted, hidden, or prevented from receiving new jobs.

As used herein, when the term "and/or" is used, it shall include all combinations of one or more of the associated described items.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are contemplated in light of the above teachings without departing from the scope and spirit of the invention. It will be readily apparent that various changes may be made thereto without departing from the spirit and scope of the disclosure or sacrificing all of its material advantages. The examples and embodiments described herein are merely exemplary of the instant disclosure.

What is claimed is:

1. A method for receiving court reporter booking services from a first mobile computing device, the method being performed by one or more processors and comprising:
    causing to display on the first mobile device at least one court reporter rating;
    receiving, from the first mobile computing device, a job request to book court reporter services;
    assigning a court reporter to the job request using real-time data at least partially based on location based services of a second mobile computing device of the court reporter;
    delivering confirmation of the court reporter service booking for display on an interface of the first mobile computing device; and
    delivering confirmation of the court reporter service booking for display on an interface of the second mobile computing device.

2. The method of claim 1, further comprising the method of:
    receiving location data from a plurality of court report computing device;
    transmitting data to the first mobile computing device for displaying a list of available court reporters; and
    receiving selection of a particular court reporter from the list.

3. The method of claim 2, further comprising the method of:
    receiving data confirmation that court reporter finished transcribing a job at the court, defining a newly available court reporter; and
    including the available court reporter on the list.

4. The method of claim 3, wherein the newly available court reporter is placed in a queue.

5. The method of claim 1, further comprising the method of:
    applying a discount; and
    charging a user of the first mobile computing device for services rendered.

6. The method of claim 2, wherein the selected court reporter has an option to accept or reject the job.

7. The method of claim 6, further comprising the method of providing the selected court reporter with statistical data of a user associated with the first mobile computing device, said statistical data includes data relating to prior cancellations by the user.

8. A non-transitory tangible computer-readable storage medium having executable computer code stored thereon for secure communications on a digital network, the computer code comprising a set of instructions that causes one or more processors automatically to perform the following operations:

causing to display on a first mobile device at least one court reporter rating;

receiving, from the first mobile computing device, a job request to book court reporter services;

receiving real-time location data from a plurality of court report computing device;

assigning a court reporter to the job request;

delivering confirmation of the court reporter service booking for display on an interface of the first mobile computing device;

delivering confirmation of the court reporter service booking for display on an interface of a second mobile computing device of the court reporter; and receiving selection of a particular court reporter from a list.

9. A computer implemented method for receiving court reporter booking services from a first mobile computing device, the method being performed by one or more processors and comprising:

receiving, from the first mobile computing device, a job request to book court reporter services;

assigning a court reporter to the job request using real-time data at least partially based on location based services of a second mobile computing device of the court reporter; and providing a selected court reporter with statistical data of a user associated with the first mobile computing device, wherein said statistical data includes data relating to prior cancellations by the user.

10. The method of claim 9, further comprising providing the selected court reporter based at least in part on statistical data of a particular judge.

11. The method of claim 9, further comprising providing the selected court reporter based at least in part on statistical data related to transcript orders following completion of jobs.

12. The method of claim 9, further comprising displaying statistics related to cancelled jobs.

13. The method of claim 9, further comprising providing one or more statistics of a particular judge on the first mobile device.

14. The method of claim 9, further comprising displaying on the first mobile device past experience of a court reporter.

15. The method of claim 9, further comprising displaying on the first mobile device at least one court reporter rating.

16. The method of claim 9, further comprising displaying on the first mobile device at least one court reporter review.

* * * * *